United States Patent [19]
Eggleston

[11] Patent Number: 5,979,864
[45] Date of Patent: Nov. 9, 1999

[54] DOUBLE CONVOLUTED PLIABLE PRESSURE CONVERSION UNIT

[75] Inventor: Philip Wayne Eggleston, Sherman, Tex.

[73] Assignee: Fisher Controls International, Inc., Clayton, Mo.

[21] Appl. No.: 08/846,121

[22] Filed: Apr. 25, 1997

[51] Int. Cl.⁶ .................................................. F16K 31/126
[52] U.S. Cl. .................................... 251/58; 92/13.2; 92/90; 92/98 R; 92/130 C; 251/61.3
[58] Field of Search .............................. 251/58, 61, 61.2, 251/61.3, 61.4, 61.5; 92/89, 90, 91, 92, 98 R, 13.2, 130 C

[56] References Cited

U.S. PATENT DOCUMENTS

| | | | |
|---|---|---|---|
| Re. 35,136 | 1/1996 | Hasegawa et al. | 92/99 |
| 362,767 | 5/1887 | McNair | 403/362 |
| 2,190,117 | 2/1940 | Griffith | 200/58 |
| 2,251,481 | 8/1941 | Corbin, Jr. | 251/58 |
| 2,293,269 | 8/1942 | Rufus | 137/21 |
| 2,296,213 | 9/1942 | Kretzschmar | 267/1 |
| 2,305,099 | 12/1942 | Morris | 287/53 |
| 2,535,382 | 12/1950 | Bachli et al. | 287/53 |
| 2,641,280 | 6/1953 | Fleischhauer | 137/62.5 |
| 2,642,216 | 6/1953 | Carter | 226/116 |
| 2,707,966 | 5/1955 | Taplin | 137/116.5 |
| 2,722,881 | 11/1955 | Sutterfield et al. | 98/41 |
| 2,731,534 | 1/1956 | Hansen et al. | 219/4 |
| 2,870,873 | 1/1959 | Mueller | 188/33 |
| 2,878,701 | 3/1959 | Weersma | 81/71 |
| 3,011,758 | 12/1961 | McFarland, Jr. | 251/331 |
| 3,070,029 | 12/1962 | Russell | 103/150 |
| 3,082,792 | 3/1963 | Jenkins | 137/790 |
| 3,084,901 | 4/1963 | Thorburn | 251/61 |
| 3,175,472 | 3/1965 | Little | 92/94 |
| 3,195,418 | 7/1965 | Zukas | 91/416 |
| 3,224,345 | 12/1965 | Doetsch | 92/94 |
| 3,254,660 | 6/1966 | Ray | 137/66 |
| 3,275,286 | 9/1966 | Wood | 251/328 |
| 3,282,171 | 11/1966 | Tuckmantel | 92/99 |
| 3,434,395 | 3/1969 | Londal | 92/6 |
| 3,452,961 | 7/1969 | Forsman | 251/31 |
| 3,486,731 | 12/1969 | Magnani et al. | 251/58 |
| 3,513,059 | 5/1970 | Prohaska | 156/446 |
| 3,516,442 | 6/1970 | Munroe | 137/625.66 |
| 3,588,036 | 6/1971 | Harter | 251/61 |
| 3,610,571 | 10/1971 | Cisco | 251/63.6 |
| 3,717,322 | 2/1973 | Bernard | 251/61 |
| 3,719,199 | 3/1973 | Mentink | 137/269 |
| 3,719,343 | 3/1973 | Werra | 251/61.1 |
| 3,804,364 | 4/1974 | De Lepeleire et al. | 137/86 |
| 3,814,119 | 6/1974 | Bertrand et al. | 137/86 |
| 3,817,452 | 6/1974 | Dean, Jr. | 236/49 |
| 3,845,783 | 11/1974 | De Lepeleire | 137/504 |
| 3,862,739 | 1/1975 | Fujiwara | 251/134 |
| 3,945,565 | 3/1976 | Lynch et al. | 236/49 |
| 3,958,592 | 5/1976 | Wells et al. | 137/315 |
| 3,963,377 | 6/1976 | Elliot et al. | 417/90 |
| 3,978,922 | 9/1976 | Johnson et al. | 166/224 A |
| 3,980,135 | 9/1976 | Garrett | 166/224 A |
| 3,982,558 | 9/1976 | Ochs | 137/455 |
| 4,003,547 | 1/1977 | Synder et al. | 251/31 |
| 4,014,386 | 3/1977 | Johnson et al. | 166/321 |
| 4,017,025 | 4/1977 | Dravnieks et al. | 236/49 |
| 4,027,692 | 6/1977 | Bouteille et al. | 137/270 |
| 4,111,221 | 9/1978 | Olsen | 137/67 |
| 4,111,608 | 9/1978 | Elliot et al. | 417/112 |
| 4,147,094 | 4/1979 | Iguchi | 92/48 |
| 4,151,819 | 5/1979 | Inada et al. | 123/119 A |
| 4,178,938 | 12/1979 | Au | 128/207.15 |
| 4,187,764 | 2/1980 | Cho | 91/442 |
| 4,225,110 | 9/1980 | Akkerman et al. | 251/58 |
| 4,240,335 | 12/1980 | Stucka et al. | 92/96 |
| 4,261,546 | 4/1981 | Cory et al. | 251/58 |
| 4,278,108 | 7/1981 | Casacci | 137/613 |
| 4,295,630 | 10/1981 | Card et al. | 251/14 |
| 4,309,022 | 1/1982 | Reinicke et al. | 251/61.4 |
| 4,340,079 | 7/1982 | Smith et al. | 137/207 |
| 4,364,414 | 12/1982 | Bouteille et al. | 137/624.14 |
| 4,434,707 | 3/1984 | Takeuchi et al. | 91/376 R |
| 4,441,519 | 4/1984 | Terral | 137/15 |
| 4,480,811 | 11/1984 | Card et al. | 251/14 |
| 4,527,769 | 7/1985 | Stogner et al. | 251/14 |
| 4,545,433 | 10/1985 | Wambaugh | 166/105 |
| 4,546,953 | 10/1985 | Vinoiguerra et al. | 251/58 |
| 4,569,378 | 2/1986 | Bergandy | 141/266 |
| 4,572,237 | 2/1986 | Thompson | 137/487.5 |
| 4,582,082 | 4/1986 | Tosseghini | 137/270 |
| 4,604,944 | 8/1986 | Tsubouchi | 92/98 D |
| 4,732,189 | 3/1988 | Jones et al. | 137/220 |

| | | | |
|---|---|---|---|
| 4,783,046 | 11/1988 | Young et al. | 251/61.4 |
| 4,787,413 | 11/1988 | Saggers | 137/494 |
| 4,809,733 | 3/1989 | Hawkins | 251/62 X |
| 4,877,058 | 10/1989 | Stoll | 137/625.48 |
| 4,889,153 | 12/1989 | Zepernick et al. | 137/269 |
| 4,925,498 | 5/1990 | Kemmler | 137/382 |
| 4,930,555 | 6/1990 | Rudick | 141/98 |
| 4,971,288 | 11/1990 | Tanner et al. | 251/57 |
| 4,977,922 | 12/1990 | McWilliams | 137/269 |
| 4,986,299 | 1/1991 | Schultz | 137/269 |
| 5,007,330 | 4/1991 | Scobie et al. | 92/120 |
| 5,016,856 | 5/1991 | Tartaglino | 251/61 |
| 5,029,806 | 7/1991 | Huo-Lien et al. | 251/61.4 |
| 5,069,248 | 12/1991 | Gill | 137/613 |
| 5,086,801 | 2/1992 | Peacock et al. | 137/12 |
| 5,101,853 | 4/1992 | Mailliet et al. | 137/242 |
| 5,190,263 | 3/1993 | Roberts | 251/60 |
| 5,236,006 | 8/1993 | Platusich et al. | 137/375 |
| 5,275,014 | 1/1994 | Solomon | 62/324.1 |
| 5,277,397 | 1/1994 | Tartaglino | 251/61 |
| 5,279,325 | 1/1994 | Kaspers | 137/270 |
| 5,305,987 | 4/1994 | Baumann | 251/298 |
| 5,337,797 | 8/1994 | Janssen et al. | 141/206 |
| 5,348,270 | 9/1994 | Dinh | 251/61.1 |
| 5,357,999 | 10/1994 | Loth et al. | 251/62 X |
| 5,370,147 | 12/1994 | Brusse et al. | 137/15 |
| 5,469,774 | 11/1995 | Kaspers | 91/54 |
| 5,487,527 | 1/1996 | Eggleston | 251/62 |
| 5,507,467 | 4/1996 | Mott | 251/58 |

FOREIGN PATENT DOCUMENTS

| | | |
|---|---|---|
| 0 192 973 | 9/1986 | European Pat. Off. . |
| 2250058 | 5/1975 | France . |
| 2 509 008 | 1/1983 | France . |
| 2133237 | 1/1973 | Germany . |
| 2 343 069 | 2/1975 | Germany . |
| 23 43 069 | 2/1975 | Germany . |
| 3024439 | 1/1982 | Germany . |
| 42 44 573 | 7/1994 | Germany . |
| 4420822 | 12/1995 | Germany . |
| 56-63164 | 5/1981 | Japan . |
| 958832 | 5/1964 | United Kingdom . |
| 1 595 576 | 7/1969 | United Kingdom . |
| 2047344 | 11/1980 | United Kingdom . |

OTHER PUBLICATIONS

Fisher Controls, "Type 657 and 667 Diaphragm Actuators," Bulletin 61.1:657, Apr. 1992.

Fisher Controls, "470 Series Piston Actuators," Billetin 61.2:470, Jul. 1993.

Fisher Controls, "Type 585 and 585R Piston Actuators," Bulletin 61.2:585, Jul. 1993.

Compteurs Schlumberger, Division Controle Industriel, Technical File, FT50–37/C, "Servo–Moteur Pneumatique Reversible, Type KW," pp. 1–8, Mai 1976 (Translation supplied).

*Primary Examiner*—George L. Walton
*Attorney, Agent, or Firm*—Marshall, O'Toole, Gerstein, Murray & Borun

[57] ABSTRACT

A rotary valve actuator with movable actuator linkage maintained in a constant "pull-pull" tension, includes a sliding canister, rotatable lever, and a return spring substantially aligned in-line with each other. The linear motion of the canister in response to an expanding and contracting pressurized bladder is converted through chain linkage into rotary lever motion. The return spring is connected through respective chain linkage to the lever so the pulling tension of the spring/lever linkage rotates the lever and maintains tension on both chain linkages. Adjustable travel stops are provided. In an alternate embodiment the return spring chain linkage is configured at right angles to the linear movement of the canister. A double acting rotary valve actuator with pressurized bladders on opposite sides of a rotatable lever. One bladder is oval shaped. The other bladder is oval shaped with double convolutions enabling the associated canister to be driven with a center rod through the middle of the double convolutions bladder. A linear valve actuator with a double convolutions bladder driving a canister center rod through the bladder center, and with a return spring for actuating a valve stem.

6 Claims, 13 Drawing Sheets

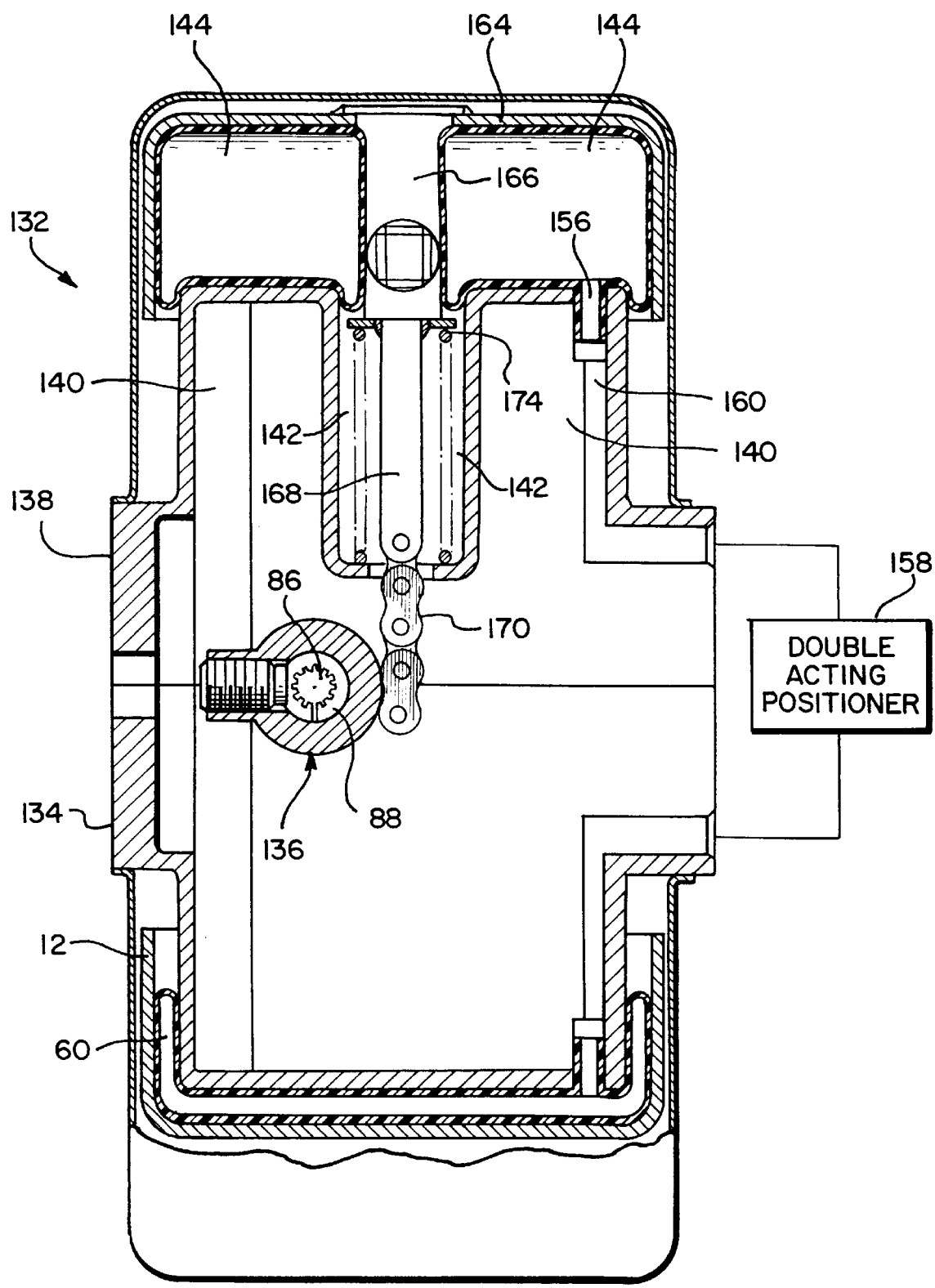

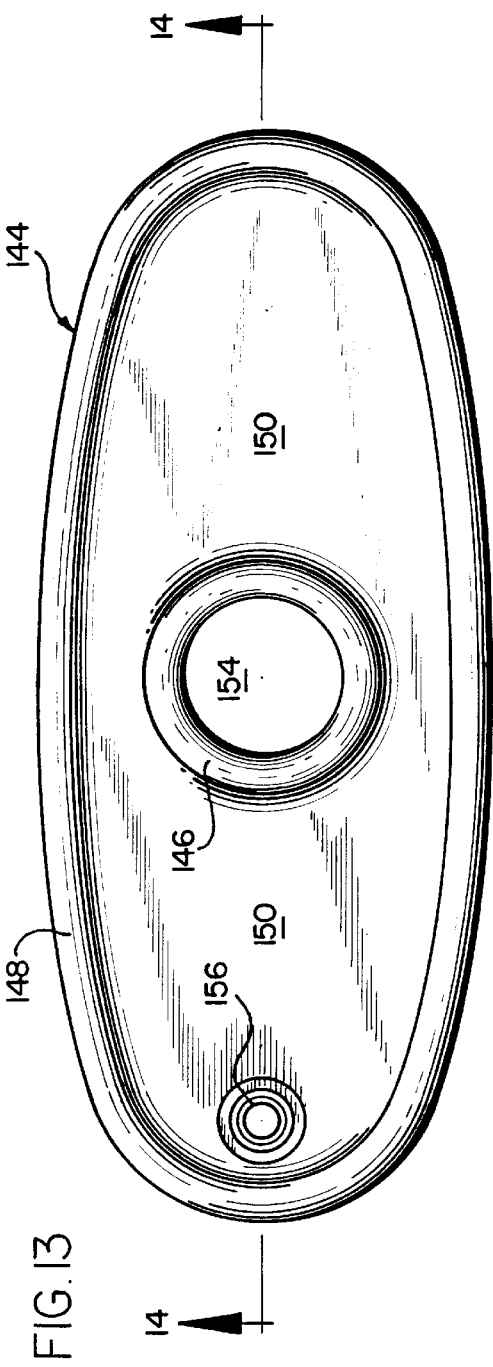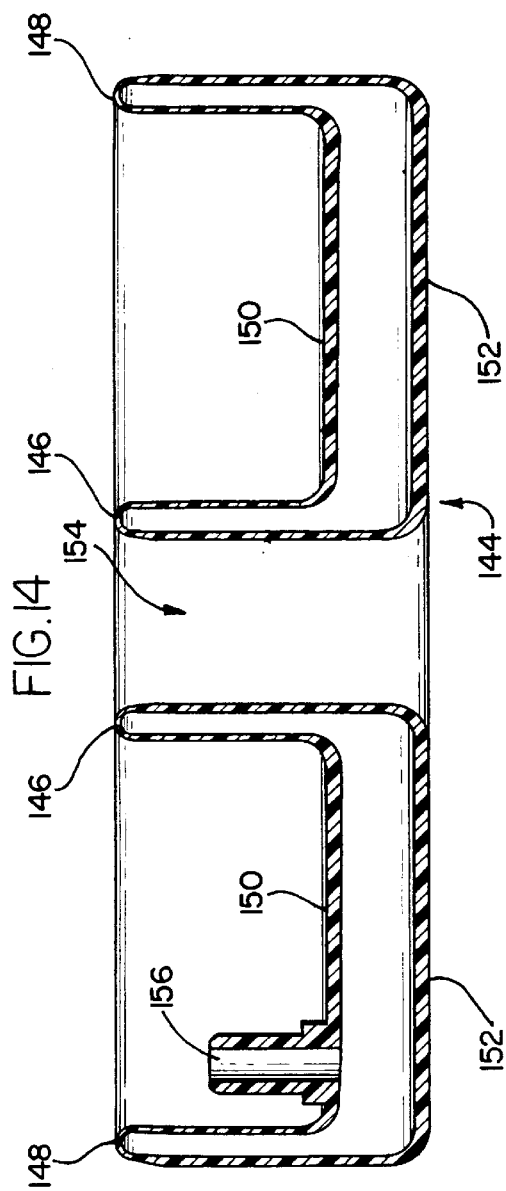

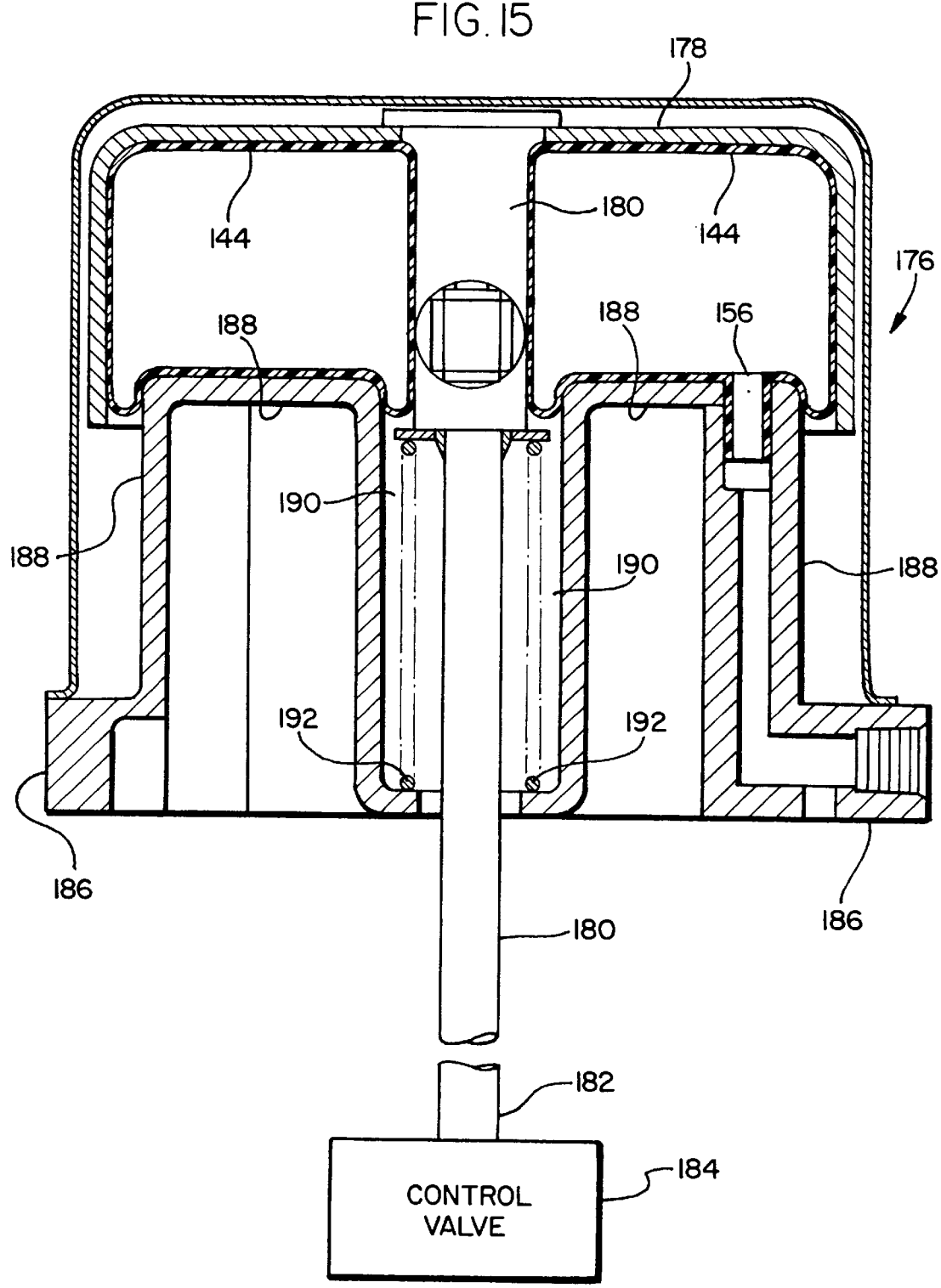

DOUBLE CONVOLUTED PLIABLE PRESSURE CONVERSION UNIT

This invention relates generally to fluid flow control devices and in particular to actuators for fluid flow valves incorporating pliable pressure conversion units such as expandable bladders.

BACKGROUND OF THE INVENTION

A variety of fluid flow control valves and corresponding valve actuators are utilized for on/off control or throttling the flow of fluid, such as in a gas or oil pipeline system, or in other process fluid systems. The fluid flow control valves are typically sliding stem control valves or rotary action control valves and are operated by a valve actuator such as a pneumatic piston or diaphragm actuator responding to the output of a valve positioner or valve controller instrument for accurate throttling control of the valve.

In the case of rotary action control valves, these units typically employ a flow control member in the form of a rotatable ball, rotatable ball segment, or a rotatable butterfly element. The rotation of the flow control element opens and closes the valve gate or plug.

Valve actuators for controlling such rotary action control valves typically employ a movable diaphragm connected to a rod at the diaphragm center. Moving the diaphragm displaces the rod linearly and thus requires a linear to rotary action translation. A rotational link arm has one end fixed to the valve rotary shaft and the other link arm end is coupled to the diaphragm rod. Linear movement of the diaphragm rod moves the link arm and thereby actuates a rotational movement in the valve shaft which is ultimately connected to the rotatable flow control element in the fluid control valve.

Such presently available rotary valve actuators employ many components, several of which require time consuming and expensive machining during manufacture. A manufacturer and users of rotary valve actuators therefore must inventory a large number of parts, and also must inventory an increasing number of expensive, machined spare parts for repair and replacement.

It is desired therefore to reduce the number of parts as well as to reduce the number of time consuming and expensive machined parts in a rotary valve actuator so as to thereby reduce manufacturing costs and inventory requirements both for the manufacturer and the user. In addition, it is further desired to provide a rotary valve actuator of reduced size and weight, and one having the capability of actuating a variety of rotary valves to reduce the number of rotary valve actuators required.

Other valve actuators are known which utilize an expandable bladder for driving a movable member under controlled pressure supplied to the bladder unit. Reference may be made to my U.S. Pat. No. 5,487,527, and to my pending application, Ser. No. 08/630,529, both assigned to the same assignee as herein, which describe valve actuators employing expandable bladders driving a movable actuator member.

In certain valve actuator applications using expandable bladders it is desired to have an actuator profile more closely fit the control valve and pipeline configuration. Presently used round shaped bladders can only be configured or oriented one way. Such desired flexibility in matching profile configurations also is presently not possible without sacrificing actuator force output. It is further desired to transmit the bladder pressurized force directly as linear actuating forces internal to the movable actuator member.

SUMMARY OF THE INVENTION

In accordance with the principles of the present invention there is provided a valve actuator which includes an improved expandable bladder. In one embodiment an expandable bladder is preformed to include two convolutions of a bladder surface to form a donut shaped unit with a hole through the bladder center. A movable actuator member driven by the bladder has a central shaft extending through the bladder center hole.

This improved double convoluted bladder enables the expanding bladder forces to transmit linear forces internal to the movable actuator member, and simplifies guiding of the movable actuator member. Also, a more direct method of measuring valve stem movement is enabled through the use of the central shaft.

In another expandable bladder embodiment an oval shaped bladder enables either the long bladder axis or the short bladder axis to be configured in a desired manner. Thus, the oval bladder profile can be made to fit the desired shape in a particular control valve and pipeline configuration without sacrificing force output. The oval shaped bladder can be formed with the normal single convolution or with the double convolution of the present invention. Rather than the oval shape, a rectangular or square shape can be used to obtain the desired actuator configuration or orientation. However, the oval shape is preferred over the rectangular or square shape. Because of the strength of the oval unit, there is no sacrificing of the actuator output force.

Valve actuators with expandable bladders according to the present invention can be utilized to actuate sliding stem valves or rotary shaft valves.

In accordance with the principles of the present invention, there is provided a rotary valve actuator with movable actuator linkage maintained in a constant "pull-pull" tension. A rotary valve actuator of the present invention includes a sliding cylinder or canister operated by a pressurized bladder, enabling a rolling diaphragm bladder action to linearly move the sliding canister. A cylindrical shaped lever is attached by a flexible canister/lever linkage to the sliding canister on one side of the lever. The linear motion of the sliding canister and the resulting pulling tension of the canister/lever linkage is converted into a rotary motion of the lever about its cylindrical axis.

In a double acting rotary actuator embodiment of the invention, a second sliding canister operated by a pressurized bladder is provided on the other side of the rotatable lever, and is attached to the lever by respective flexible linkage. Each bladder may be respectively suitably pressurized by a double acting positioner for controllably enabling expansion and contraction of the two bladders. Each canister therefore constantly maintains pulling tension on the respective linkage. The rotatable lever is coupled by a zero lost motion universal connection to a valve shaft of a fluid control valve.

Suitably pressurizing one bladder with respect to the other bladder pulls the respective linkage and rotates the lever in one direction while maintaining both linkages in constant "pull-pull" tension. This desired constant "pull-pull" tension also is obtained when the other bladder is suitably pressurized to rotate the lever in the other direction.

In a single acting rotary actuator embodiment of the invention, only one pressurized bladder is provided. A spring return is used in place of one of the bladders/canisters on one lever side to maintain constant "pull-pull" tension. The double acting embodiment is preferred in applications where more actuator thrust power is desired. Because each bladder/canister is not pulling against the return spring, the double acting rotary actuator of this invention can provide greater actuator thrust power to actuate, for instance, smaller fluid control valves having higher pressure drops.

In the single acting rotary actuator embodiment, opposed to the sliding canister and on the other side of the rotatable lever there is provided a return spring which is attached to the lever with a flexible spring/lever linkage. The spring is precompressed to a predetermined load so the pulling tension of the spring/lever linkage tends to rotate the lever in the direction of the spring, and at the same time pull an unoperated sliding canister towards the lever and against an adjustable, canister bottom travel stop.

When the pneumatic pressure is introduced into the bladder, the pressure will force the sliding canister away from the lever and thereby rotate the lever in the direction of the sliding canister. The top travel of the sliding canister is restricted by an adjustable, canister top travel stop that is aligned with a stop pawl extending from the lever. As the lever rotates, it comes into contact with the stop. As the sliding canister rotates the lever, this causes the spring to compress and resist the pull from the sliding canister. When the pressure is released from the bladder, the spring pulls the sliding canister back down against the canister bottom travel stop.

The respective linkage between the lever and the sliding canister on one side, and between the lever and the spring on the other side of the lever can be flexible or rigid in nature. Flexible linkage can be formed for instance of chain material, cables, etc. Rigid linkages can be formed of linked bars, rack and pinion members, etc. When using flexible linkage, the lever arm length is always the same distance from the center of the lever arm through its 90° rotation. In contrast, with rigid linkage, the lever arm length is reduced by 300 at the end of the lever arm travel. Also, the flexible linkage produces constant torque through the 90° rotation of the lever and is desired over rigid linkage which produces variable torque throughout the lever rotation.

A significant advantage is provided by the mounting of the rotating lever intermediate the sliding canister on one side and the return spring on the other side of the lever in a "pull-pull", constant tension configuration. With the spring being mounted separately from the sliding canister, this enables the lever arm to be shorter for the spring as compared to the lever arm for the sliding canister. A shorter lever arm reduces the spring travel and in turn reduces the spring height, making the actuator profile smaller, the actuator weight lighter, and the actuator construction less costly.

The pull-pull, constant tension valve actuator configuration of the present invention continually takes any lost motion out of the linkage connecting the sliding canister cylinder, rotating lever, and return spring. In contrast, in normal linkage configurations in actuators, continuous cycling of the movable actuator components causes wear and eventually an undesired lost motion condition is exhibited. In the present invention the pull-pull, constant tension feature between the sliding canister and the spring with the intermediate rotating lever not only eliminates the lost motion problem of prior actuators, but also eliminates the need for precision mated parts, since all mating parts are kept in tension.

In a preferred embodiment of the present invention, the two sliding canisters in the double acting unit or the sliding canister and spring in the single acting unit are respectively spaced 1800 apart, in-line and resisting each other through the connecting linkage. The tension forces transmitted through the linkage of the sliding canisters to the lever (and from the lever to the spring linkage in the single acting unit) minimizes the load on the lever bearings and thereby minimizes bearing wear. Also, with the linkage in tension, the actuator housing is placed in compression, and the housing material in compression is more desirable than in tension. Also, with the housing material parts in compression only a minimum number of fasteners are required for reliably maintaining the housing parts assembled.

In the single acting unit a return spring, spring end caps and spring linkage is preassembled to form a spring cartridge. The spring cartridge can then be mounted in the housing as a unitary unit. This insures that the spring linkage is not damaged when preloading the spring and insures good linkage alignment with the lever and also reduces user safety issues during assembly of the actuator components.

The linkage between the lever and the sliding canister is connected at the side wall of the sliding canister thereby simplifying the over all assembly. This connection reduces the number of parts required to carry the pulling load to the rotatable lever thereby reducing actuator size, weight and cost.

A valve positioner or a valve controller instrument is mountable directly onto the actuator. The use of a sliding canister enables the ease of providing manifolding air passageways from the bladder unit to the direct mounted valve positioner, which eliminates the need for exterior tubing interconnecting the positioner and actuator units.

In an alternative embodiment of the pull-pull, constant tension rotary valve actuator of the present invention, the return spring is mounted 90° to the center line of the sliding canister, with the same rotatable lever as in the prior mentioned in-line actuator embodiment. This alternative 90° embodiment of the pull-pull actuator of the present invention provides a more compact profile configuration than the in-line embodiment, and may be preferred for use with certain valve situations. The same pressure actuated bladder, sliding canister, rotating lever, and spring cartridge are utilized as in the in-line embodiment. Also, the same advantages of the in-line rotary actuator embodiment are obtained by this alternative 90° rotary actuator embodiment, except that because the spring is positioned 90° to the center line of the sliding canister, this tends to create a diagonal load on the lever bearings, which diagonal bearing load is not present in the in-line embodiment.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 12 is a rear elevational view, partly sectional, of FIG. 10 illustrating the respective linkage to the opposing canisters;

FIG. 13 is a plan view illustrating a double convoluted bladder used on one side of the rotatable lever of the double acting rotary valve of FIG. 10;

FIG. 14 is a sectional view taken along section lines 14–14 of FIG. 13; and

FIG. 15 is a schematic view illustrating a valve actuator having a double convoluted bladder useful for linear actuation of a sliding stem valve.

DETAILED DESCRIPTION

Figure 1:
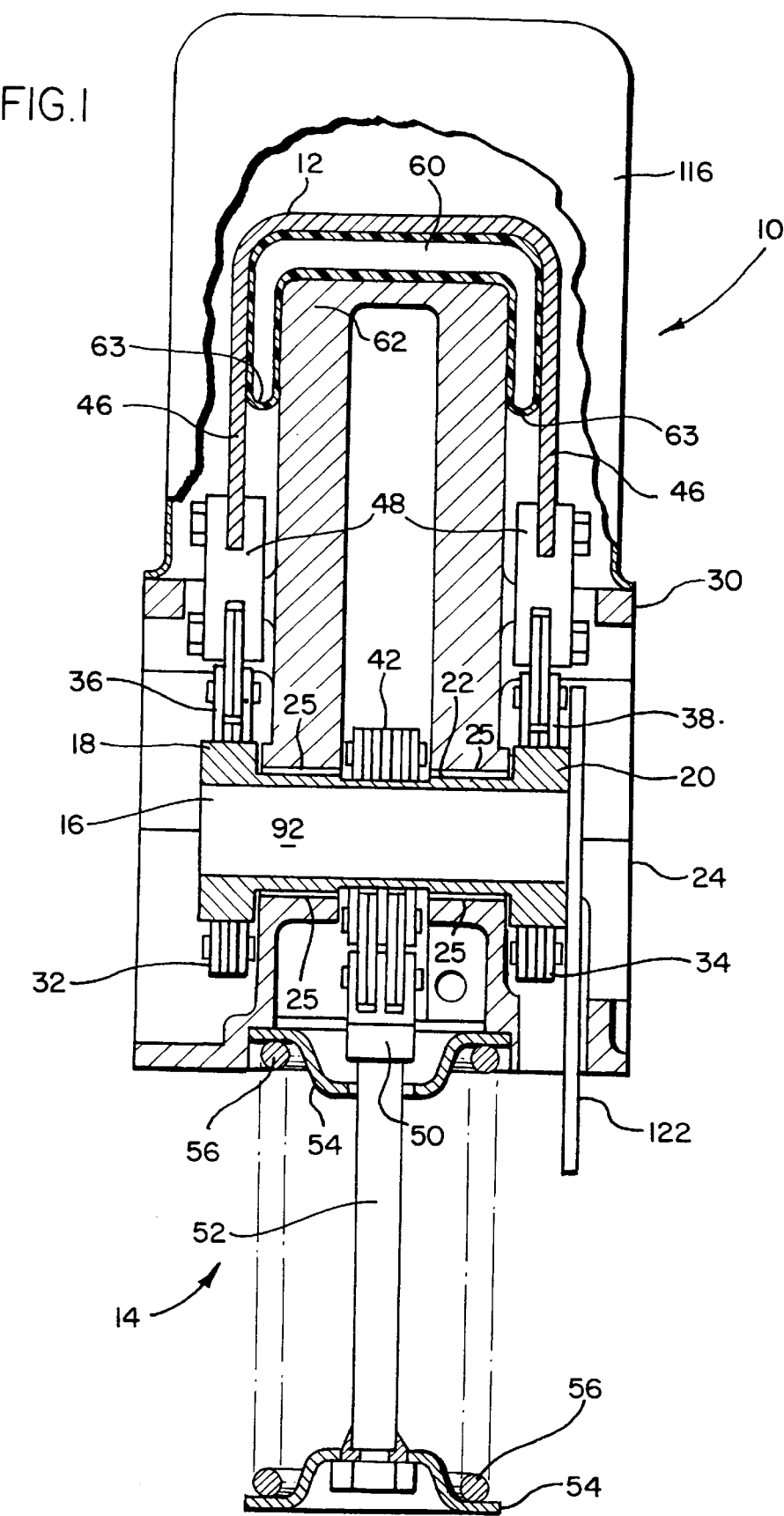
FIG. 1 is an elevational view, partly sectional, illustrating a single acting rotary valve actuator constructed in accordance with the principles of the present invention, and with a canister cover at one end fragmented and a spring cartridge cover at the other end removed for convenience of illustration.

Referring now to the drawings, there are illustrated several types of valve actuators incorporating an expandable bladder. A rotary valve actuator for fluid control valves is shown, wherein the bladder operated actuator includes linear to rotary transformation in which tension is always maintained in the linkage between opposing actuating elements by enabling the actuating elements to pull against each other in a pull-pull, constant tension configuration. A linear valve actuator having a bladder operated linear moving member useful for actuating sliding stem valves also is shown.

Figure 8:
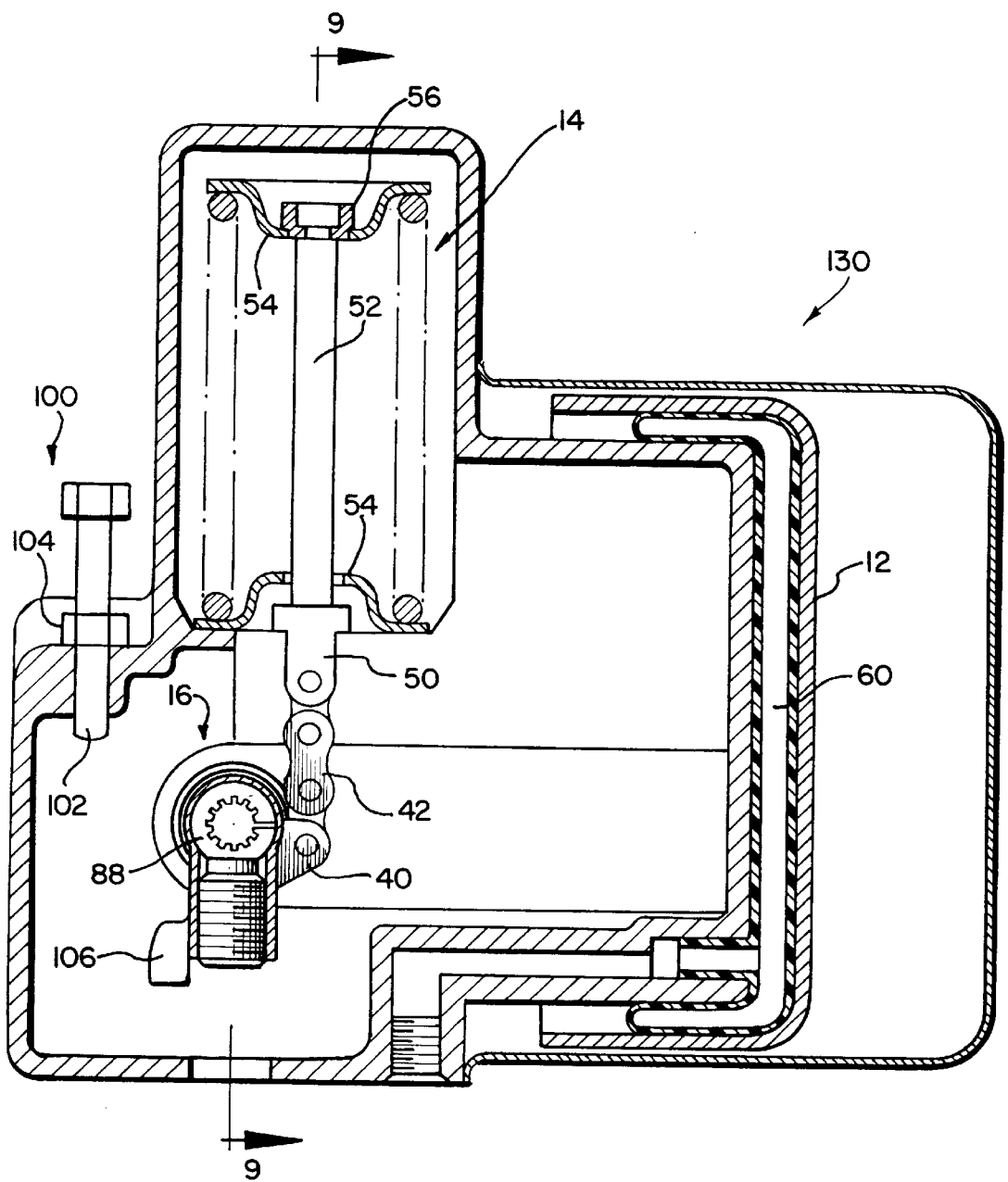
FIG. 8 is a sectional elevational view, partly fragmented, illustrating an alternative embodiment of a single acting rotary valve actuator according to the present invention wherein the sliding canister and return spring are located 90° relative to each other.
Figure 9:
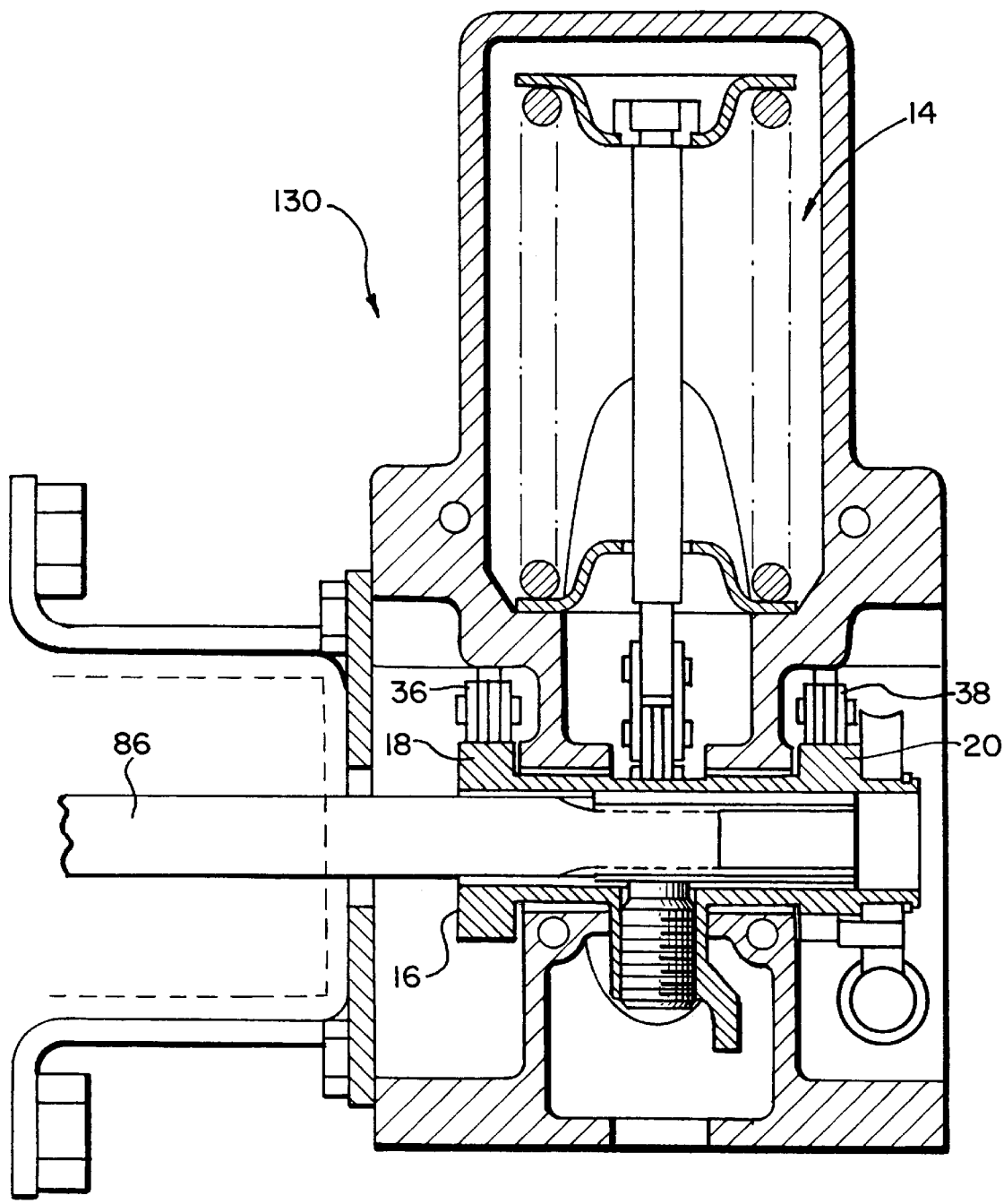
FIG. 9 is a sectional elevational view taken along section lines 9—9 of FIG. 8.

In particular, FIGS. 1–7 illustrate a single acting rotary valve actuator having an oval shaped bladder wherein the pull-pull actuating elements are in an in-line configuration. FIGS. 8 and 9 illustrate a single acting rotary valve actuator having an oval shaped bladder wherein the pull-pull actuating elements are in a right-angle configuration. FIGS. 10–14 illustrate a double acting rotary valve actuator having two opposite oval shaped bladders, one of which has double convolutions in a bladder surface, and wherein the pull-pull actuating elements are in an inline configuration. FIG. 15 illustrates a linear valve actuator having a single oval shaped bladder with double convolutions in an in-line configuration.

Initially the single acting (i.e., single pressurized acting) rotary valve actuators of FIGS. 1–9 will be described, followed by a description of the double acting (i.e., double pressurized acting) rotary valve actuator of FIGS. 10–14 and then followed by a description of the linear valve actuator of FIG. 15.

With reference to FIGS. 1–7, there is illustrated a single acting, in-line rotary valve actuator 10 which includes a slidably movable canister 12, an opposite spring cartridge 14 and an intermediately coupled rotatable lever 16, such that the linkage coupling mechanism is always in pull-pull tension. That is, when the canister 12 is being moved in a linear manner oppositely away from the lever 16 in a pulling linkage manner, the opposite spring cartridge 14 is resisting this pulling action of the canister and is itself exerting a pulling force on the respective linkage coupling. Therefore, there is provided a unique "pull-pull" rotary valve actuator 10 which keeps the coupling or respective linkage always in tension.

Figure 5:
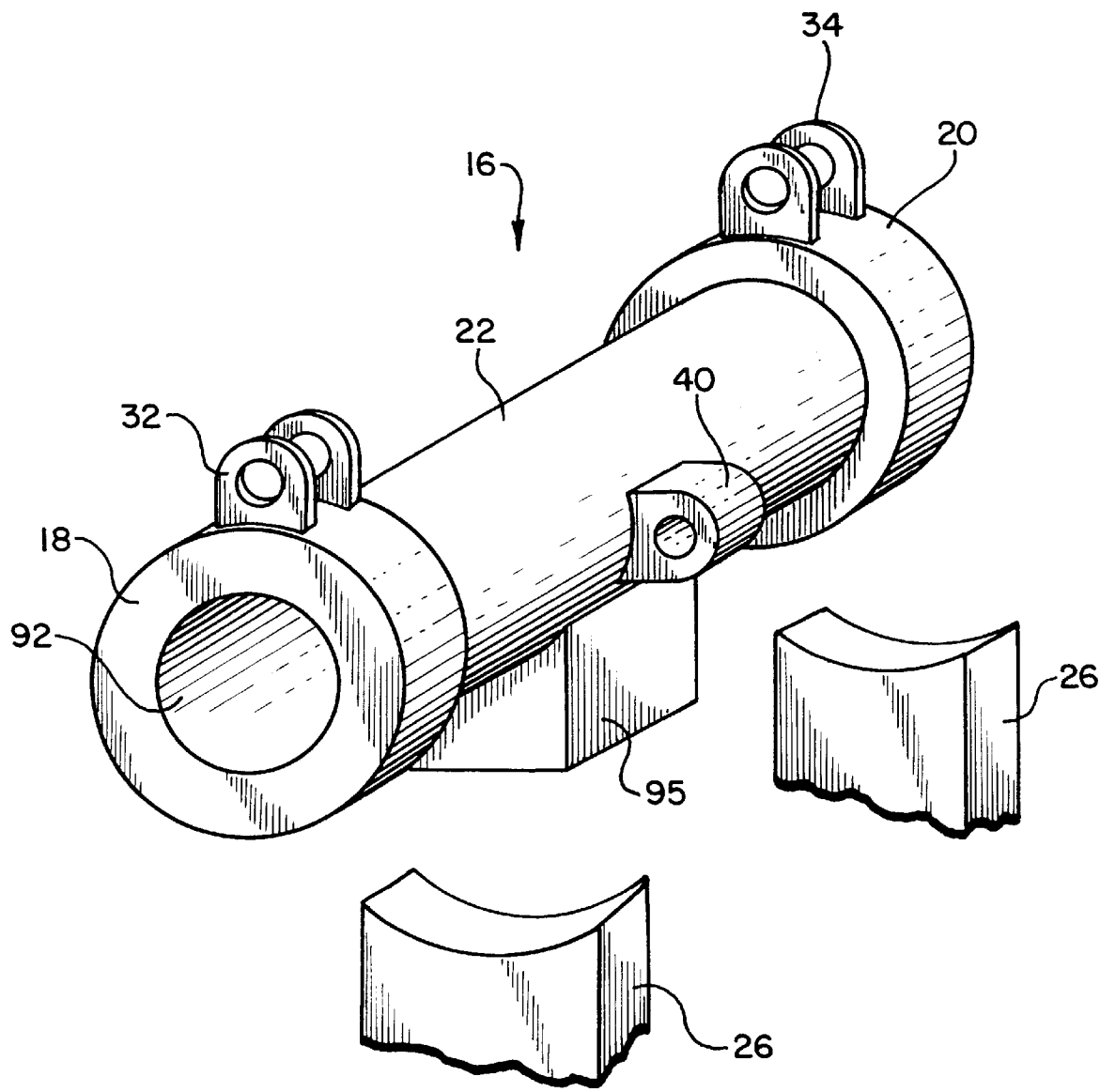
FIG. 5 is a perspective view illustrating a rotatable cylindrical lever utilized in the rotary valve actuator of FIG. 1.

The rotatable lever 16 is formed of a hollow hard metal such as steel, cylindrically shaped with opposite flange ends 18, 20 and an intermediate middle portion 22 as shown in FIG. 5. The lever 16 is rotatably mounted within a lower housing 24 and is supported on suitable bearings 25 (see FIG. 1) such that the lever middle portion 22 is supported on bearing support columns 26 in the frame 24. A pair of support columns 28 similar to columns 26 are also provided in an upper housing 30. As can be seen from FIG. 3, mounting of the lower housing 24 to the upper housing 30 captures the lever 16 between opposing support columns 26, 28 so as to rotatably mount the lever 16 within the rotary valve actuator 10. Instead of support columns, other lever support structure can be provided, such as cast-in wall sections in the housing.

Respective canister linkage mounts 32, 34 project from the respective link flanges 18, 20 for mounting respective chain linkages 36, 38 to the canister 12 (see FIG. 1). A boss 40 projects from the lever middle section 22 for mounting chain linkage 42 to the spring cartridge 14.

The canister 12 includes a top portion 44 and depending side portions 46. A respective canister/chain connector 48 is mounted to respective opposite canister sides 46 at one connector end and at the other connector end to a respective chain linkage 36, 38.

Figure 3:
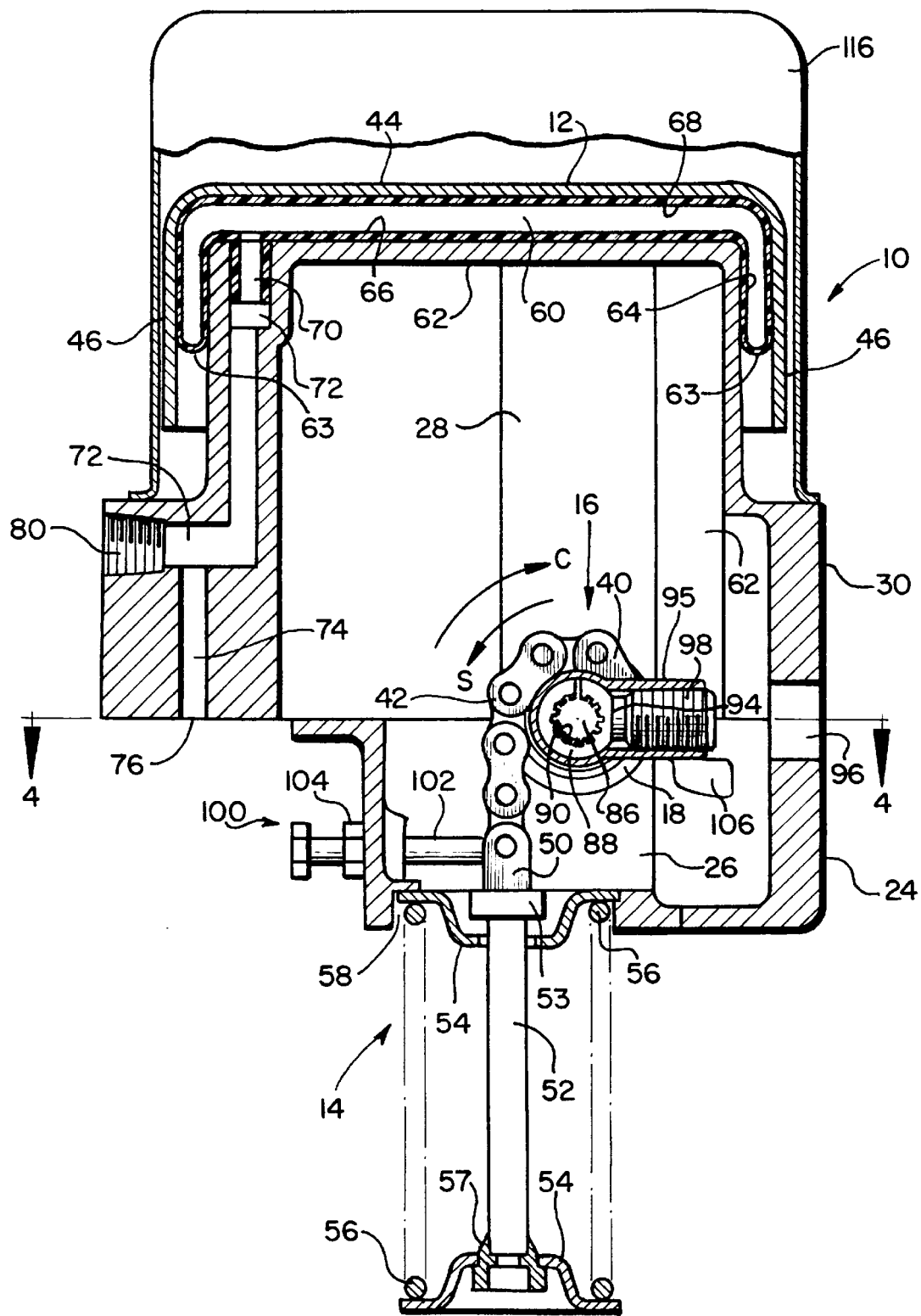
FIG. 3 is a left side elevational view, partly sectional, of FIG. 1 illustrating the rotary valve actuator with the spring cartridge cover removed.

With reference to FIG. 3, it can be seen that one end of the chain 42 is connected to the lever boss 40. The other end of chain 42 is mounted to a spring connector 50 which extends from a spring rod 52 within the spring cartridge 14. The spring cartridge 14 also includes opposite end plates 54 and a spring 56 mounted between the end plates 54. As can be seen in FIG. 3, spring rod 52 extends through a suitable aperture in the upper end plate 54 and is mounted by a split rod connector 57 at the grooved rod end to the lower end plate 54. The upper end of the spring cartridge 14 is nested within a spring cavity 58 provided within the housing 24.

A sealed, expandable bladder unit 60 is provided between canister 12 and an upstanding dome section 62 of the frame 30. The bladder 60 preferably is a sealed, preformed bladder unit formed of two pieces joined by heat sealing at a joint as disclosed in application Ser. No. 08/630,529, the disclosure of which is incorporated herein by reference.

Figure 6:
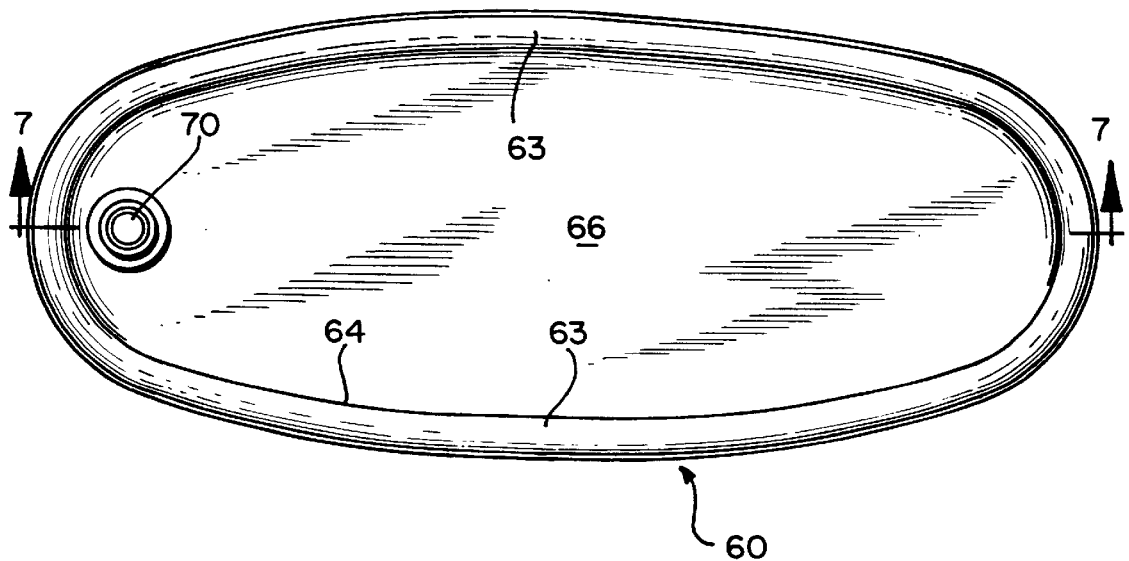
FIG. 6 is a plan view illustrating a bladder used in the rotary valve actuator of the present invention.
Figure 7:
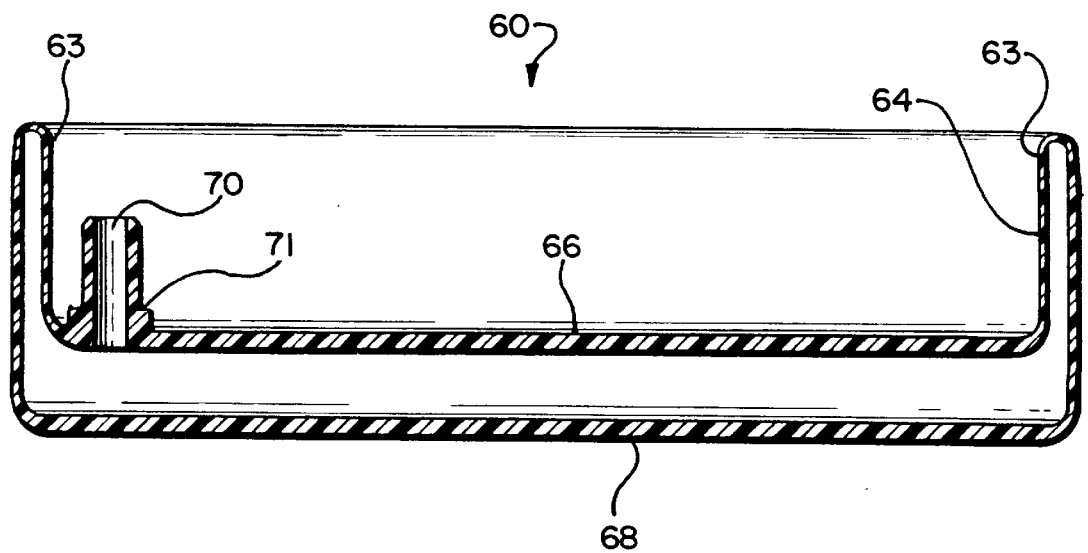
FIG. 7 is a sectional view taken along section lines 7—7 of FIG. 6.

Referring to FIGS. 3 and 6, it can be seen that the bladder 60 has an oval shape with an internal surface 64 which fits snugly around the dome shaped projection 62 in the initial deflated bladder condition. As shown in FIGS. 1 and 3, the bladder 60 is mounted on the dome 62 such that the inside bladder surface 64 at the bladder sides is immediately adjacent the dome 62 exterior sides, and with a bladder bottom surface 66 immediately adjacent the dome top surface of the dome 62. A bladder top surface 68 also lies immediately adjacent the canister top 44. Therefore, the expandable bladder 60 is trapped between the stationary housing dome 62 and the slidably movable canister 12.

The bladder may be formed of polyurethane with a cloth backing layer. For lower temperature usage the cloth backing layer is not required. The cloth backing layer, if used, surrounds the entire bladder and serves to reinforce the bladder material for use at high operating temperatures. At extreme upper temperatures, a thermopolyester plastic material such as Riteflex may be used for the bladder, with or without a cloth reinforcing layer.

The bladder is preferably preformed in the natural state to the smallest chamber size between the canister 12 and the top of dome wall 62. A bladder annular perimeter portion 63 is formed as a convolution of the bladder bottom surface 66. A cloth reinforcing layer can be placed on the exterior surfaces of the bladder by insertion during injection mold forming of the bladder. Alternatively, after injection molding of the bladder, the cloth can be applied thereto by suitable pressure and temperature conditions. A urethane layer can be used on a bias cut cloth prior to heat bonding to the bladder at a temperature of about 330° F. (166° C.) at 50 psi (345 Kpa) for about 1½ hours. Instead of applying a cloth layer on the entire bladder exterior, the cloth may be applied only to the annular perimeter portion 63.

The cloth reinforced, preformed bladder is then baked in an oven to stress relieve the material. It has been found that such stress relieving of the bladder in an oven can be accomplished at about 250° F. (121° C.) for about 24 hours.

To keep the bladder in place during actuator operation, upon assembly into the actuator, bonding adhesive beads may be applied above and below the bladder two-piece joint at the canister 12. Similarly the bladder can be bonded with a suitable adhesive to the top of the dome wall 62.

The bladder enables a rolling diaphragm action at the bladder perimeter portion 63 instead of an undesired balloon-type action during expansion of the bladder. As the valve actuator is operated by coupling fluid into the bladder chamber the bladder perimeter portion 63 in contact with the stationary dome side wall, merely rolls off of engagement with the stationary member while simultaneously increasingly engaging the side wall of the movable canister.

Thus, the bladder perimeter portion 63 is expanding in going from an initial unpressurized position to a pressurized position with the bladder perimeter portion merely moving from the inside diameter of the bladder to the outside diameter of the bladder in a rolling fashion placing the bladder material under tension. This significantly reduces bladder wear, increases the bladder life and enables repeated actuator operation over extended operating cycles and wide temperature and pressure ranges.

A bladder inlet tube 70 is inserted within a passageway 72 in housing 30 which passageway 72 leads to a connecting passageway 74 having an opening 76 at the bottom of frame 30 as seen in FIG. 3. The inlet tube includes a shoulder 71 for mounting an 0-ring (not shown) to seal the bladder inlet within the passageway 72.

Passageway opening 76 communicates with an instrument 78, such as a pneumatic positioner (see FIG. 2) so that initiating pressurized expansion and contraction of the expandable bladder 60 is under control of the instrument 78 in a known manner. It is understood that the positioner 78 has been removed from FIG. 3 for convenience in illustrating other components of the rotary valve actuator 10. A plug 80 is inserted into the end of the passageway 72 during normal operations and may be removed from the passageway to gain access to the fluid passageway 72.

Figure 4:
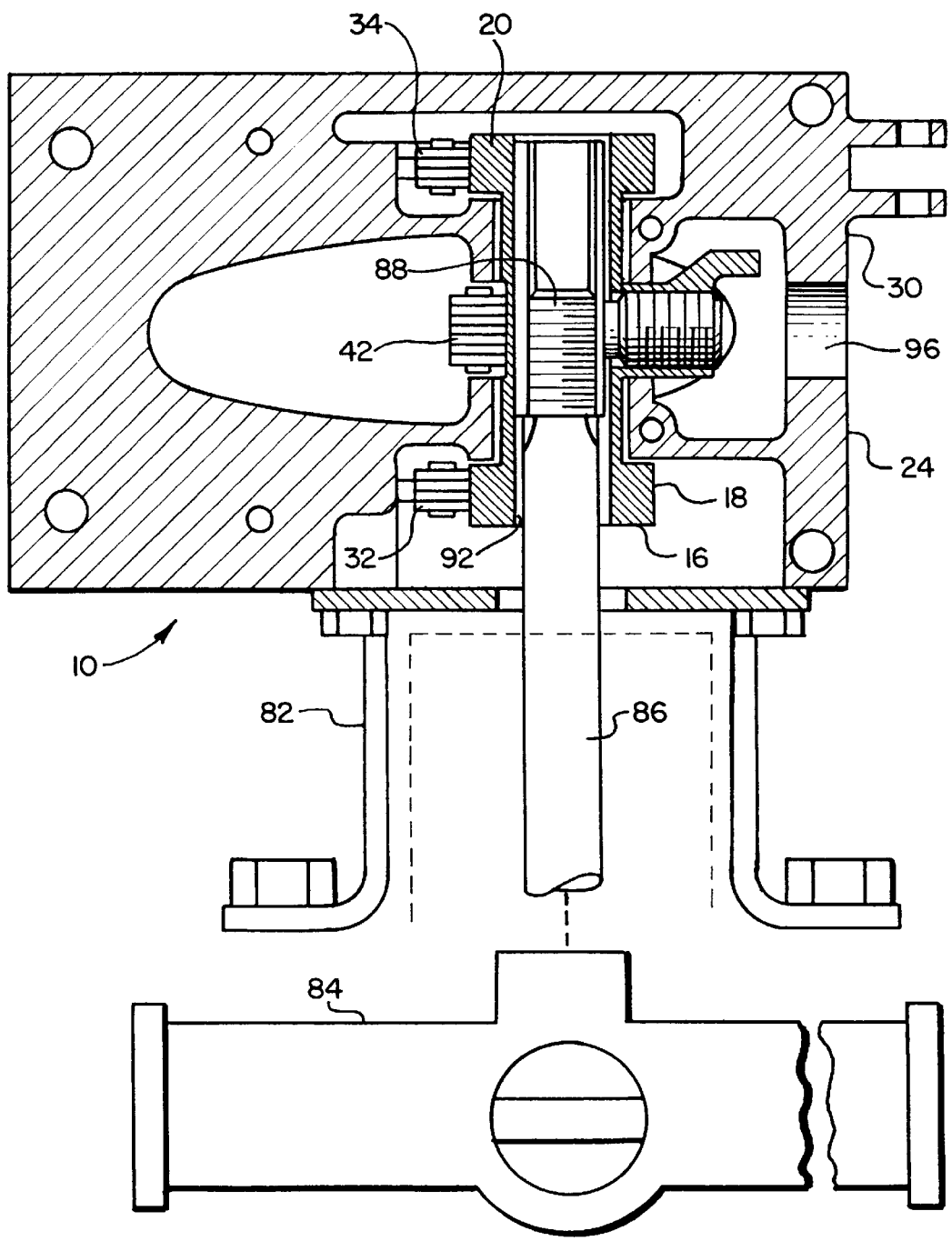
FIG. 4 is a partly sectional view taken generally along section lines 4—4 of FIG. 3, illustrating the rotary valve actuator operating a rotary shaft for actuating a fluid control valve.

With reference to FIG. 4, there is illustrated the rotary valve actuator 10 with a mounting bracket 82 which may be used to mount the valve actuator 10 to a fluid control valve 84, as schematically illustrated in FIG. 4. A valve shaft 86 includes a splined end so as to be rotatably driven by the rotating lever 16 with very little if any lost motion between the rotating lever 16 and the valve shaft 86. Providing this lost motion connection is a splined sleeve 88 (see FIG. 3) having interior splines 90 matching the splines on the end of shaft 86. The sleeve 88 has an outer diameter adapted to the lever bore 92, and further includes a flat section 94. A shaft mounting projection 95 having an internal threaded bore extends from the lever middle section 22 (see FIG. 5). The lever is rotated so the projection 95 is placed opposite an access hole 96 provided in the lower housing 24 as shown in FIG. 3. The sleeve 88 is inserted into the lever bore 92 and the flat section 94 is positioned opposite the access hole 96 in the lower frame 24. A threaded set screw 98 known as a "dog point set screw" includes a corresponding flat end for locking engagement with the flat section 94 of the sleeve 88.

With the valve shaft and sleeve positioned within lever bore 92 such that the sleeve flat section 94 is aligned with the threaded bore hole provided through the mounting projection 95 and into the interior of the lever 16 at the bore 92, the set screw 98 threadably engages the bore. The threaded set screw 98 is mounted into the projection 95 until the set screw flat faces lockingly engages the flat section 94 of the sleeve 88 to thereby secure the splined sleeve 88, and the splined end of shaft 86. This ensures that the valve shaft 86 will rotatably move with the lever 16 with very little, if any, lost motion between the shaft and lever. The sleeve 88 may be split to provide a secure connection to the shaft and lever.

Respective adjustable stops are provided for the movement of the spring as well as the sliding canister. With reference to FIG. 3, there is illustrated a canister top position adjustable stop 100 which includes a threaded stop rod 102 threadably engaged within housing 24 and which can be locked into position by a locking nut 104. A pawl 106 extends from the mounting projection 95 so as to rotate with the position of lever 16. As can be seen in the notations provided on FIG. 3, linear upward movement of the canister 12 during expansion of the bladder 60 rotates the lever 16 in a clockwise direction, which is indicated by the reference arrow and notation "C". In FIG. 3 there is also provided a notation indicating the direction of rotation of the lever 16 under pulling action of the spring 56, which reference arrow notation is marked "S". Accordingly, as the canister 12 moves linearly upwardly in response to the expanding bladder, the pawl 106 rotates clockwise until engaging the end of the stop rod 102. Stop 100 therefore sets the uppermost or top position of the canister 12. The stop position may of course be adjusted by unlocking nut 104 and threadably adjusting rod 102 until the desired uppermost canister position is reached.

Figure 2:
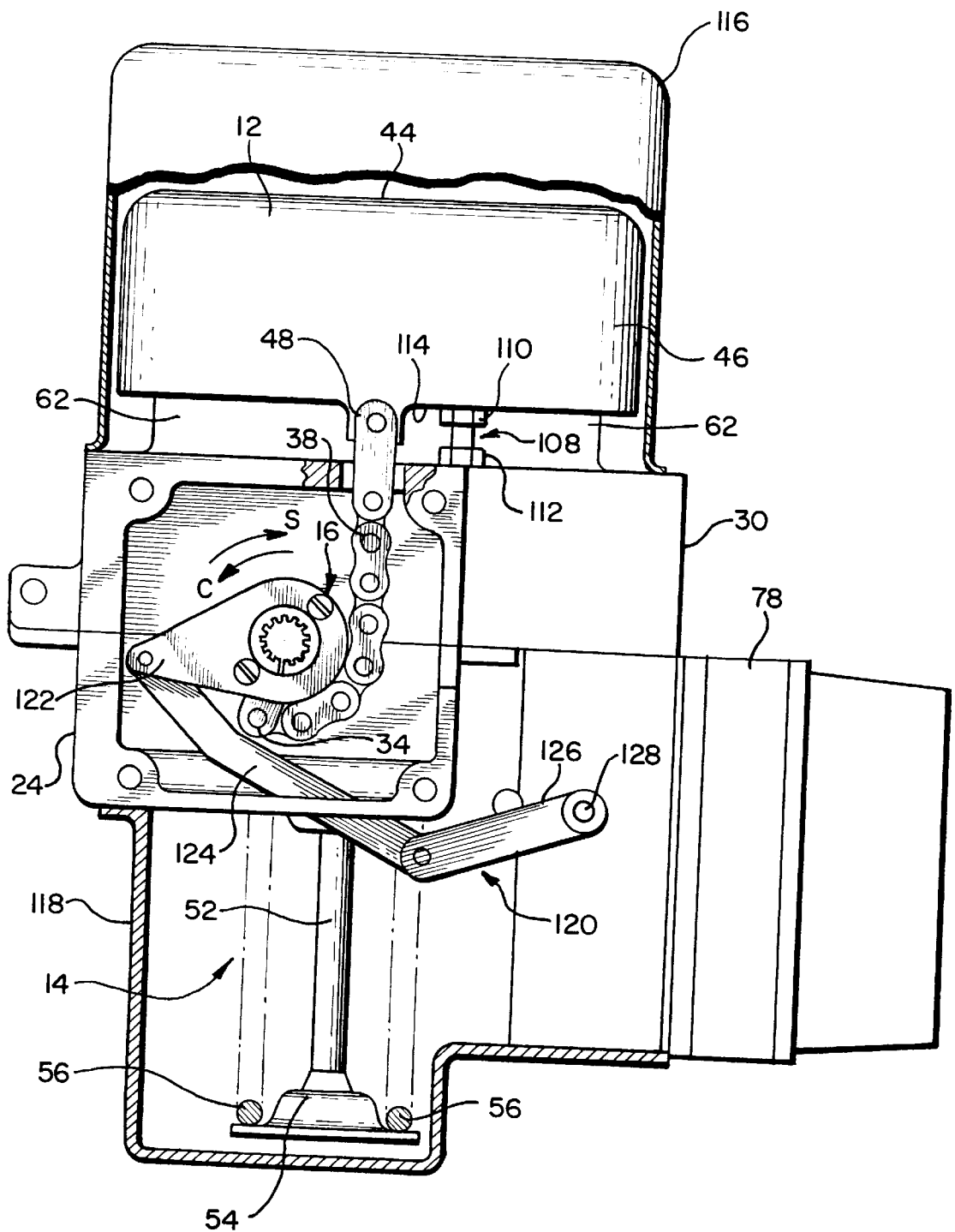
FIG. 2 is a right side elevational view, partly sectional, of FIG. 1 illustrating the rotary valve actuator with a direct mounted valve positioner and a spring cartridge cover assembled in position.

Referring to FIG. 2, a respective canister bottom position-adjustable stop 108 provided on opposite canister sides includes a threaded stop bolt 110 which is threadably engaged into the housing 30 and can be locked into position using a locking nut 112. The spring 56 tends to pull the canister 12 downwardly in FIG. 2, which rotates lever 16 in the illustrated clockwise direction "S" until the bottom end 114 of the canister engages the threaded stop bolt 110. The stops 108 therefore sets the lowermost or bottom position of the canister 12. The position of the adjustable stop 108 can readily be changed by unlocking nut 112 and threadably adjusting the position of stop bolt 110.

A canister cover 116 is provided for completely covering the canister 46, chain connector 48, and adjustable stops 108. The cover 116 may be suitably detachably mounted to the top of the housing 30. Similarly, a spring cartridge cover 118 may be suitably detachably mounted to the lower housing 24 to cover the spring cartridge 14.

With reference to FIG. 2, there is illustrated a feedback linkage 120 interconnecting the positioner 78 to the rotatable lever 16. A feedback arm 122 is connected such as by screws to the lever flange 20 so as to rotate with the lever 16. A bent linkage 124 is pivotably connected at one end to the feedback arm 122 and with the other bent linkage end passing through a slot in the housing 24 to pivotably engage a straight link arm 126, which in turn is connected to a rotating shaft 128 in the positioner 78. It is to be understood that the valve positioning instrument 78 can be a digital valve controller, such as a communicating, microprocessor-based current to pneumatic instrument. In addition to the normal function of converting a input current signal to a pneumatic output pressure, the digital valve controller, using a communications protocol, can provide easy access to information critical to process operation. Thus, one can gain information from the principle component of the process, i.e. the fluid control valve 84, using a compatible communicating device at the control valve or at a field junction box, or by using a personal computer or operator counsel within a control room. Alternatively, the instrument can be an analog device or a pneumatic positioner.

As can be seen in FIG. 2, the feedback linkage 120 has one end mounted to the rotating shaft 128 on a positioner 78 and another end mounted via the feedback arm 122 to the actuator rotating lever 16. Because the lever 16 is interconnected with the rotating valve shaft 86, the position of the valve shaft is sensed by the positioner 78 through the feedback linkage 120.

Assembly of the components of the pull-pull rotary valve actuator 10 illustrated in FIGS. 1–7 is readily provided in the following manner. Initially, the bladder 60 is snugly mounted atop the dome 62 on the upper housing member 30. The spring cartridge 14 is inserted into the spring cavity 58 on the lower housing 24. The spring cartridge 14 is then mounted to the lever using appropriate nuts and bolts fasteners to interconnect the spring chain linkage 42 to the spring connector 50 at one end and to the lever boss 40 at the other end. The two canister chain links 36, 38 are then connected to the respective lever linkage mounts 32, 34 at one end and to the respective chain connectors 48 at the other end.

The lever 16 may now be emplaced onto the support columns 26 with suitable bearings. Next, upper housing 30 is mounted onto the lower housing 24 and the housings are secured together. The canister chain links 36, 38 are then connected to the respective canister sides using respective canister connectors 48 and suitable fasteners. The positioner 78 is then mounted to the housing 30 and the feedback linkage 120 is interconnected between the lever 16 and the positioner. Thereafter, the covers 116, 118 can be mounted and the mounting bracket 82 as well, if desired.

The initial positioning of the canister and spring with respect to the adjustable stops is accomplished as follows. Initially, the spring 56 in the spring cartridge 14 is precompressed to a predetermined load, and the spring cartridge is inserted into the housing and connected to the lever as described. Then the spring 56 is preloaded with the linkage so the spring block 53 on the spring rod 52 is moved off of the top end plate 54 as shown in FIG. 3. Next the bladder is pressurized to move the canister up sufficiently so the two adjustable stops 108 can be mounted to the housing 30. Both travel stops 110 are then adjusted so that the sliding canister 12 bottoms evenly against the stops before reaching the end of its travel in the downward direction and so there is still tension maintained in the linkage (see FIG. 3). This sets the canister bottom position.

Note in FIGS. 2 and 3 that as the spring 56 pulls on the linkage 42 it will rotate the lever 16 in the reference direction "S" and at the same time pull the sliding canister 12 downward against the adjustable travel stops 110. Also, FIG. 2 and 3 show the reference direction "C" as the upwardly moving canister 12 pulls on linkage 36, 38 and at the same time compresses the spring.

When air pressure is supplied through openings 76, passageways 74, 72 and into the bladder 70, the pressure will expand the bladder 60 and force the sliding canister 12 in a linear upward movement which correspondingly rotates the lever 16 in the clockwise direction "C" as shown in FIG. 3. The adjustable stop 100 is adjusted to restrict the upper-most travel of the sliding canister 12 and ensure that the desired control valve position is reached.

Several advantages are afforded by the pull-pull rotary valve actuator 10 as shown in FIGS. 1-7. The linear upward movement of canister 12 under the pressure of the expanding bladder 60 rotates the lever 16 and causes the spring 56 to compress and resist the pull from the sliding canister. This pull-pull action maintains the chain linkages 36, 38, 42 in substantially constant tension i.e., with about only a 3% variance in torque. As the pressure is released from the bladder 60, the spring 56 pulls the sliding canister 12 back towards the adjustable stops 110. This pull-pull configuration in the actuator continually takes any lost motion out of the connecting linkage due to wear caused by cycling, and further eliminates the need for precision mated parts, since all mating parts are kept in tension. Also, because the spring 57 is mounted separately from the sliding canister 12, this allows the lever arm for the spring (in FIG. 5 measured radially from the centerline of lever 16 to the connection point on boss 40) to be shorter for the spring than the lever arm for the sliding canister (as measure in FIG. 5 radially from the centerline of the lever 16 to the connection point on linkage mounts 32, 34). A shorter lever arm reduces the spring travel and in return reduces the spring height, making the actuator smaller, lighter, and less costly. Furthermore, it may be noted that since the spring and canister are substantially in-line at 180° opposite positions with respect to the lever, and with the connecting linkage to the lever in a pull-pull maintained tension condition, the amount of bearing forces exerted on the support columns 26, 28 and the associated bearings during driving rotation of the lever 16 is significantly reduced. Using flexible linkage chains 36, 38, 42 provides the lever arm (either the spring lever or the canister lever arm) to always be the same respective distance from the center of the lever through the 900 rotation of the lever. Thus, the flexible linkage produces constant torque through the 90° rotation of the lever and is therefore desired over rigid linkage which produces a variable torque over the rotatable position of the lever.

Referring now to FIGS. 8 and 9, there is illustrated an alternative embodiment of a single acting, right angle rotary valve actuator 130 which includes operating components of the sliding canister, bladder, spring cartridge, and lever identical to the same components with respect to the previously described in-line rotary valve actuator 10 of FIGS. 1–7. As can be seen from FIG. 8, rather than the in-line configuration of prior described rotary valve actuator 10, the rotary valve actuator 130 provides the return spring cartridge 14 configured 90° to the center line of the sliding cartridge 12. This tends to reduce the size, number of parts and corresponding cost of the actuator. However, because the spring cartridge 14 is angularly positioned with respect to the center line of the sliding canister 12, (rather than in-line positioning in actuator 10) this creates a diagonal load on the bearings of the rotating lever 16 of the actuator 130.

It must be recognized, however, that the rotary valve actuator 130 also provides pull-pull tension of the linkages 36, 38, 42 between the canister 12, lever 16 and spring cartridge 14, thus maintaining the linkage in constant tension. Therefore, the many significant advantages afforded by the pull-pull, in-line rotary valve actuator 10 are also accomplished by the pull-pull, 90° rotary valve actuator 130.

FIGS. 10–14 illustrate a double acting rotary valve actuator 132 of the present invention which contains many similar components as the prior described rotary valve actuators 10 and 130. The rotary actuator 132 is termed "double acting" because it incorporates a respective pressurized bladder/canister unit on each opposite sides of a rotatable lever, as compared to the previous described rotary actuators of FIGS. 1–9 which incorporate a single pressurized bladder/canister and a return spring on opposite sides of a rotatable lever.

Figure 10:
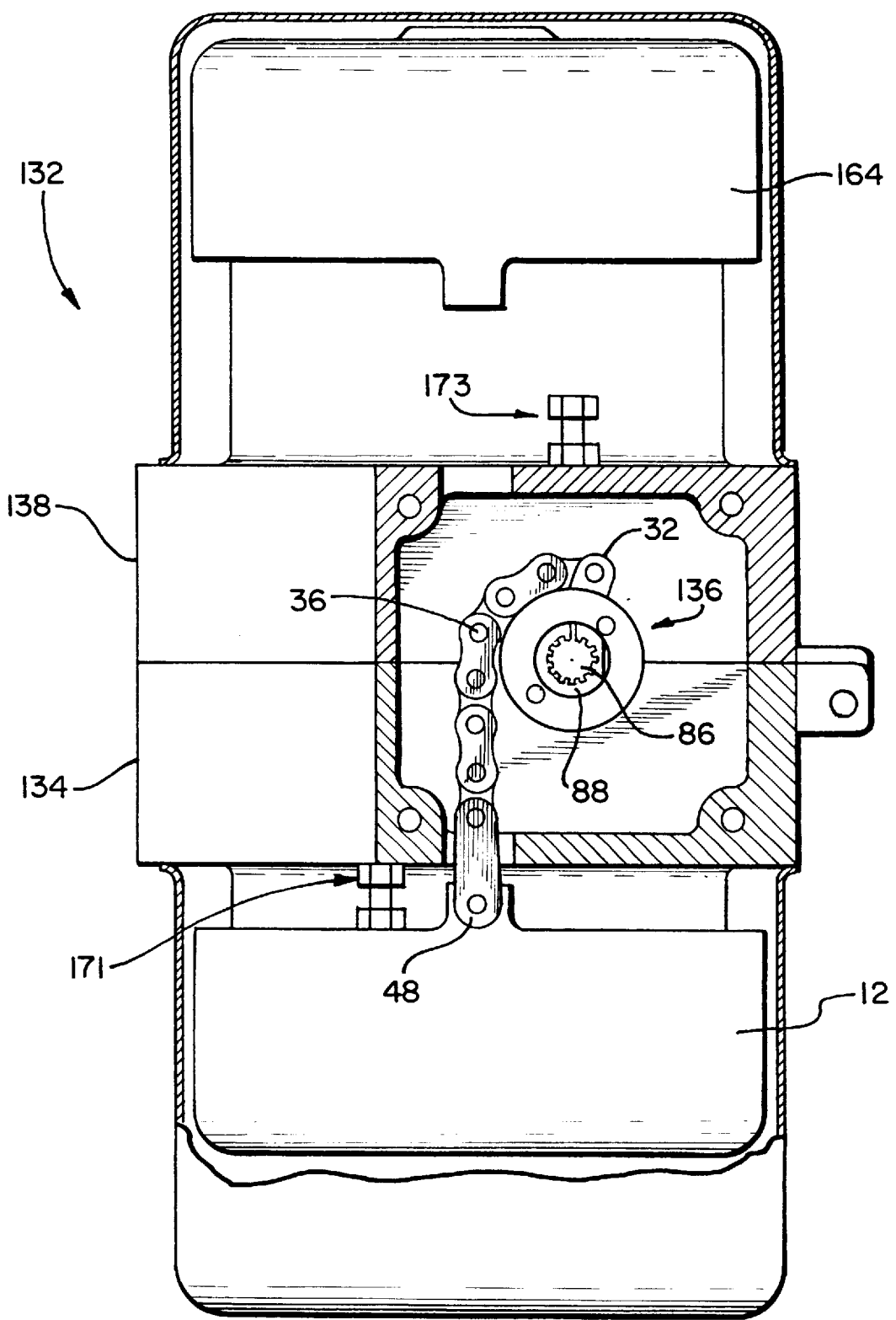
FIG. 10 is a front elevational view, partly schematic, illustrating a double acting rotary valve actuator according to the invention.
Figure 11:
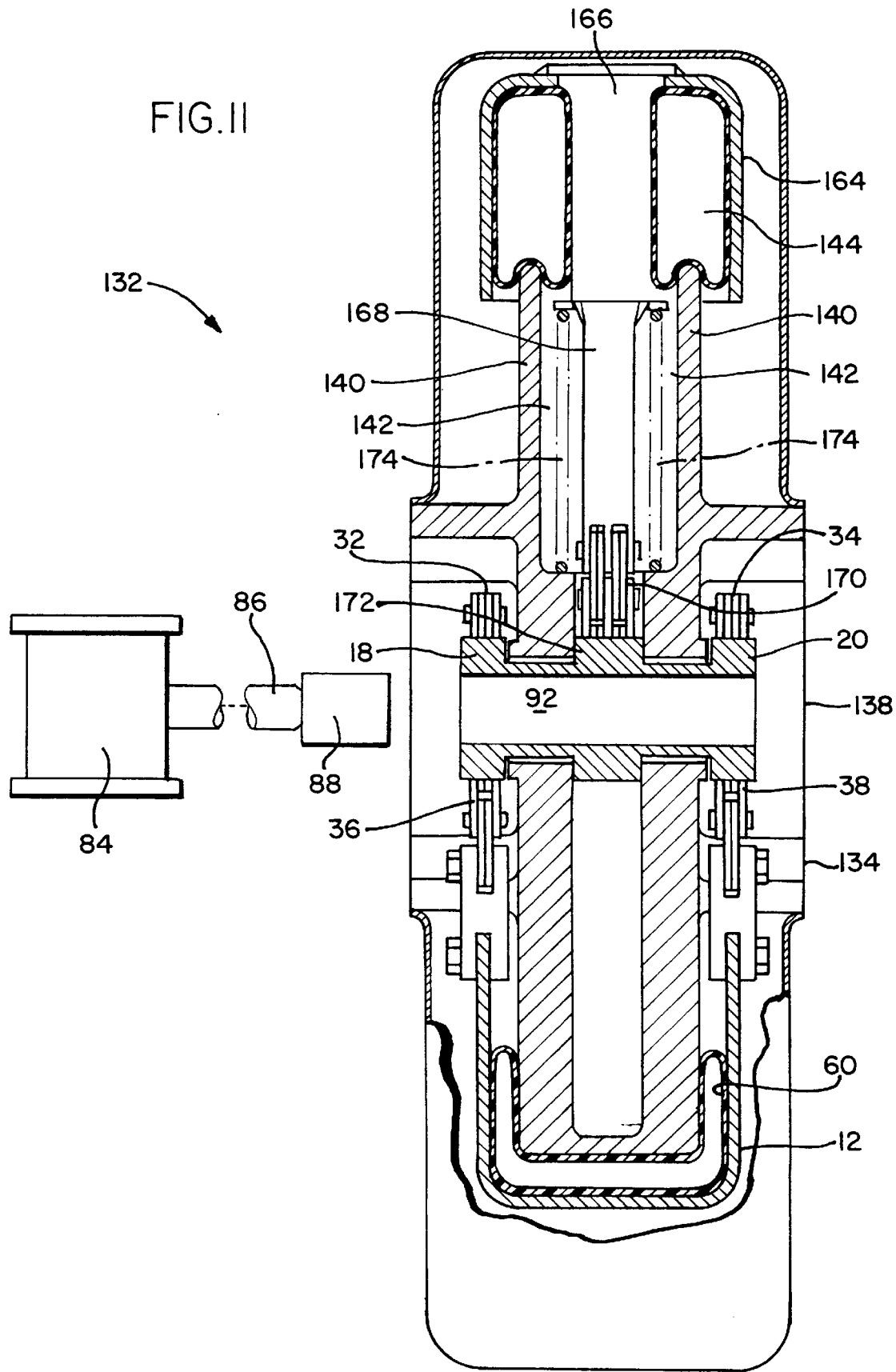
FIG. 11 is a right side elevational view, partly sectional, of FIG. 10 illustrating a respective bladder/canister on opposite sides of a rotatable lever.

With reference to FIGS. 10–12, the double acting rotary valve actuator 132 includes lower slidable canister 12 and expandable bladder 60 with chain linkage 36, 38 similar to these prior described components in the rotary valve actuator 10. The lower bladder/canister unit is mounted within a lower housing 134.

Rotatable lever 136 is rotatably mounted with suitable bearings between the lower housing 134 and an upper housing 138 and includes respective end flanges 18, 20 with respective linkage mounts 32, 34 for respective coupling to the lower canister chain linkages 35, 38. The rotatable lever 136 also includes a center boss for connecting an upper bladder/slidable canister unit in the upper housing 138.

In the upper housing 138, an oval donut shaped wall 140 has an upstanding perimeter dome with a center open area 142. Mounted atop the wall 140 there is provided an oval shaped, double convoluted bladder 144 as shown in FIGS. 13, 14. The bladder 144 has an oval, donut shape defined by a first convolution 146 forming a first circular ridge and a second convolution 148 forming a second oval ridge in a bladder bottom surface 150. The bladder also includes a top surface 152, which along with the opposite bladder surface 150 and the convolutions 146, 148 provides an opening 154 through the middle of the bladder. As can be seen from FIG. 14, the circular ridge formed by the convolution 146 defines the bladder central opening 154. The bladder 144 is preformed and constructed for operating in the same rolling diaphragm manner as bladder 60, except for adding the second convolution 146 and the opening 154 which provide significant advantages. Also, it may be noted that the inner convolution 146 rolls from the outside diameter to the inside diameter as the bladder 144 is pressurized.

A bladder inlet 156 enables controlled pressurized air from a double acting positioner 158 to supply pressurized air for controlled expansion of the bladder 144. FIG. 12 illustrates the bladder 144 mounted onto the wall 140 with the bladder inlet 156 inserted into a passageway 160 leading to a connecting passageway 162 for coupling to the double acting positioner 158 as schematically illustrated. As shown in FIG. 12, a similar connecting passageway as 162 interconnects the bladder 60 inlet to the double acting positioner. The double acting positioner 158 is a commercially available unit which controls pressure to two different inputs. In this case, the input lines to bladders 60 and 144 are simultaneously controlled so that when one line is pressurized, the other line is depressurized.

A canister 164 is mounted above the double convoluted bladder 144 so that it is slidably movable linearly towards and away from the rotatable lever 136 with expansion and contraction of the bladder 144. The canister 164 includes a center portion 166 mounted to a connector 168 for mounting to chain linkage 170 which in turn is mounted to a center boss 172 on the lever 136.

In the double acting rotary valve actuator 132 of FIGS. 10–14, both canisters 12 and 164 pull their respective chain linkages under control of the double acting positioner 158. Thus, for instance as shown in FIGS. 11 and 12, the bladder 144 has been pressurized to pull the canister 164 and the chain linkage 170 upwardly to rotate the lever 136 in one direction, while at the same time the double acting positioner 158 controllably depressurizes the inlet to bladder 60 so that the bladder 60 can be deflated and the chain linkage 36, 38 is maintained in pulling tension. The reverse pressurized actuation of bladder 60 and the corresponding simultaneous depressurization of bladder 144 can also be enabled by the double acting positioner 158. Respective adjustable travel stops 171, 173 are provided for restricting the travel of canister 12, 164.

A fail safe return spring 174 has its bottom end fixed in the housing 138 and its upper end movably mounted to the canister center portion 166. Spring unit 174 is provided to return the canisters to a home position in the event there is a failure in the pneumatic pressure supply. It is understood that the spring 174 does not otherwise operatively substantially aid or impede the actuating movements of the canisters.

A significant advantage of the double acting rotary valve actuator 132 compared to the single acting types previously described is that more thrust power is available for actuating the associated valve. In certain valve situations the ability to have more thrust power available for valve actuation is highly desirable. For instance, in the case of smaller fluid control valves with higher pressure drops, the associated valve actuator must supply more thrust power. Because the cartridges 112, 164 are not acting against a return spring as in the actuators of FIGS. 1–9, there is more thrust power available for rotating the lever 136 and thereby actuating the valve shaft 86 of the associated control valve 84.

Rather than the double convoluted bladder 144, a single convoluted bladder such as bladder 60 can be used. However, this requires two additional chain linkage mounts on the ends of lever 16 such as linkage mounts 32, 34 to be provided, rather than the linkage through the bladder center, and this in turn complicates the construction of the unit. Thus, while it is within the teachings of the present invention to provide single convoluted bladders on both sides of the rotatable lever, it is preferred to utilize the double convoluted bladder 144. The bladder 144 enables the chain linkage connection between the rotating lever and the canister 164 to be coupled through the center opening of the bladder, using the illustrated canister center portion 166 and connector 168.

FIG. 15 shows a valve actuator 176 having a slidable canister 178 operatively actuated by a double convoluted bladder 144 (see FIG. 13 and 14). A center actuating rod 180 extends from the canister center for suitable mounting to a valve stem 182 of a fluid control valve 184. Within actuator housing 186 an oval shaped upright wall 188 with central cavity 190 provides a mounting platform for the bladder 144 and canister 178.

A return spring 192 has a lower end seated at the bottom of cavity 190 and an upper end connected to move with the canister center actuating rod 180. The bottom end of rod 180 passes through an aperture at the bottom of cavity 190 so as to extend outside the housing 186 for connection to the valve stem 182.

In the expanded bladder condition of FIG. 15, a suitable pneumatic pressure has been supplied to the bladder inlet 156 to linearly move and slide the canister 178 upwardly away from the upright wall 188. This pulls the actuating rod 180 upward as well as the valve stem 182, and also expands and tensions the return spring 192. Under controlled release of the pressure from the bladder 144, the bladder is depressurized and the return spring tends to return the bladder to an initial, preformed condition shown in FIGS. 13 and 14. If desired, a linear to rotary transformation can be provided so the linear movement of actuating rod 180 can be used to actuate a rotary valve shaft. Also, if desired rather than placing the return spring 192 within the cavity 190, a return spring can be located outside the cavity and between upright wall 188 and the housing.

The foregoing detailed description has been given for clearness of understanding only, and no unnecessary limitations should be understood therefrom, as modifications will be obvious to those skilled in the art.

What is claimed is:

1. In an actuator for operating a control element used to regulate the flow of fluid through a fluid control valve, said actuator including a movable member for connection to said control element and operatively moved by an expandable bladder under fluid pressure from an initial substantially unextended position to an extended position, the improvement comprising:

a stationary member fixedly mounted in said actuator:

said bladder preformed to include first and second opposing bladder surfaces, and a bladder perimeter portion joining the opposing bladder surfaces and formed as a first convolution of one of said bladder surfaces to provide a first ridge at said bladder perimeter portion;

said one bladder surface including a second convolution to provide a second ridge and defining a bladder central opening through said bladder;

said bladder mounted intermediate said stationary member and said movable member; and a center rod extending from said control member throuah said bladder central openina and mounted to said movable member for connecting said movable member to said control element.

2. The improvement of claim 1, wherein said bladder opposing surfaces are oval shaped.

3. The improvement of claim 1, wherein said bladder is formed in an oval donut shape.

4. The improvement of claim 2, wherein said first convolution forms an oval shaped first ridge.

5. The improvement of claim 4, wherein said second convolution forms a circular shaped second ridge and a circular shaped central opening through said bladder.

6. In an actuator for operating a control element used to regulate the flow of fluid through a fluid control valve, said actuator including a movable member for connection to said control element and operatively moved by an expandable bladder under fluid pressure from an initial substantially unextended position to an extended position, the improvement comprising:

a stationary member fixedly mounted in said actuator:

said bladder preformed to include first and second opposing substantially flat bladder surfaces, and a bladder perimeter portion joining the opposing substantially flat bladder surfaces and formed as a first convolution of one of said substantially flat bladder surfaces to provide a first ridge at said bladder perimeter portion;

said opposing bladder surfaces being oval shaped said one of said substantially flat bladder surfaces located adjacent said stationary member:

the other of said substantially flat bladder surfaces located adjacent said movable member; and said bladder perimeter portion between and engaaeably contacting said stationary member and said movable member and moving in a rollina fashion therebetween during expansion of the bladder.

* * * * *

UNITED STATES PATENT AND TRADEMARK OFFICE
CERTIFICATE OF CORRECTION

PATENT NO. : 5,979,864
DATED : November 9, 1999
INVENTOR(S) : Philip Wayne Eggleston It is certified that error appears in the above-identified patent and that said Letters Patent is hereby corrected as shown below:

Col. 14, Claim 1, line 3, through

Col. 14, Claim 1, line 4, opening

Col. 14, Claim 6, line 36, engageably

Col. 14, Claim 6, line 38, rolling

Signed and Sealed this

Twenty-seventh Day of February, 2001

Attest:

NICHOLAS P. GODICI

Attesting Officer     Acting Director of the United States Patent and Trademark Office